June 6, 1950     R. W. GILBERT     2,510,691

MEGOHMMETER

Filed Feb. 10, 1945

Inventor
Roswell W. Gilbert,

By Pierce & Scheffler,
Attorneys.

Patented June 6, 1950

2,510,691

UNITED STATES PATENT OFFICE 2,510,691

MEGOHMMETER

Roswell W. Gilbert, Montclair, N. J., assignor to Weston Electrical Instrument Corporation, Newark, N. J., a corporation of New Jersey Application February 10, 1945, Serial No. 577,283

1 Claim. (Cl. 175—183)

This invention relates to megohmmeters and particularly to portable instruments of high sensitivity and wide measuring range.

Megohmmeters of the type including a hand-driven generator are of substantial size and weight, and megohmmeters of the ratio meter type have not been entirely satisfactory in view of difficulties in scale expansion for sensitivity at high resistance values.

Objects of the invention are to provide readily portable megohmmeters that are characterized by high sensitivity and wide measuring ranges. An object is to provide a megohmmeter of high sensitivity and adequate accuracy having a logarithmic scale covering a plurality of decade ranges. An object is to provide a megohmmeter including a vacuum tube and a microammeter for measuring the total cathode current (grid current plus plate current) when the tube is operated in the positive grid current region by connecting the unknown resistance between the plate and grid of the tube, the microammeter scale being logarithmic and covering a plurality of decade ranges. More specifically, an object is to provide a megohmmeter of the type last stated in which the vacuum tube is a high mu triode.

Figure 1:
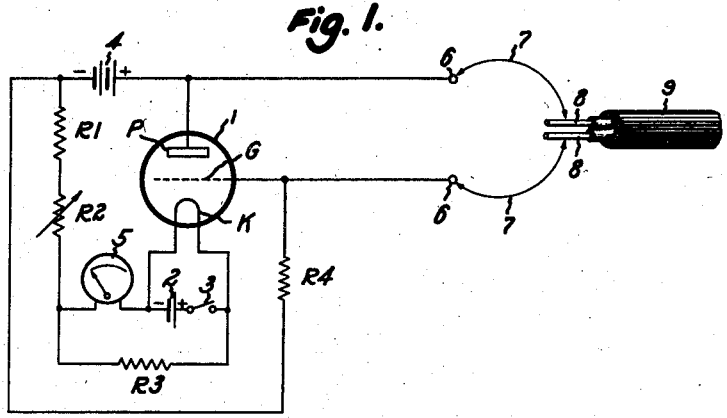
Figure 2:
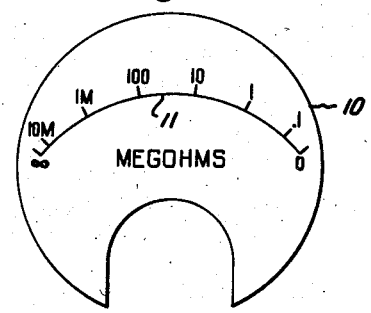

These and other objects and advantages of the invention will be apparent from the following specification when taken with the accompanying drawing in which:

Fig. 1 is a circuit diagram of a portable megohmmeter embodying the invention; and Fig. 2 is a plan view of a scale plate having a logarithmic graduated scale that is typical of the invention.

The logarithmic relation between the unknown resistance and the displacement of an instrument pointer is developed in an electron tube circuit in which the tube is operated in the positive grid current region. Various types of tubes may be employed but high mu triodes of the type employed in battery-operated radio receivers are preferable for portable insulation testers and other megohmmeters that are to be used in the field. The megohmmeter to be described is a portable insulation tester in which the triode was the high mu triode section of a type 1LH4 tube but the invention is not limited to portable megohmmeters or to any particular type of tube.

The 50 milliampere filamentary cathode K of the tube I is heated by a single 1.5 volts flashlight cell 2 when the "On-Off" switch 3 is closed. The plate battery 4 is a standard "radio receiver" battery for supplying a nominal 67.5 volts, the negative terminal of the battery being connected to the negative side of the cathode K through cathode resistors R1, R2 and a microammeter 5. The resistor R1 has a fixed value of 500,000 ohms and the resistor R2 is adjustable from 0–200,000 ohms to set the instrument pointer to the zero mark of the scale. A compensating resistor R3 of 1 megohm is connected across the instrument 5 and filament battery 2 to establish a reverse current through the instrument to compensate the small residual plate current that persists with an infinite resistance between the input terminals 6, 6 that are connected to the plate P and grid G of the tube I. Flexible leads 7, 7 are provided for connecting the unknown resistance across the input terminals. As shown schematically in Fig. 1, the leads are applied to the conductors 8, 8 of a cable 9 for a measurement of the insulation resistance between the conductors. A grid resistor R4 of about 500 megohms is preferably connected between grid G and the negative terminal of the plate battery 4 as it affords a steadier infinity mark reading, but the grid resistor is not functionally necessary.

The scale plate 10 of the instrument 5 is shown in Fig. 2, the plate having a zero-infinity scale 11 that extends over five readily legible logarithmic decade ranges—namely, from 0.1 to 10,000 megohms.

The apparatus is conditioned for a resistance measurement by closing the switch 3 to heat the cathode K, shorting the leads 7, 7, and then adjusting the cathode resistor R2 to set the instrument pointer at its full scale position, corresponding to 100 microamperes through the instrument. The test leads 7, 7 are then applied across the resistance or insulation that is to be measured, and the resistance value is indicated directly by the position of the instrument pointer along the graduated scale 11.

The measured quantity is the total cathode current, and it is therefore apparent that the effective measuring range for any given tube is determined by the selection of the battery voltages and the cathode resistances, i. e., the factors that affect the magnitude of the cathode current. The voltage drop through the total cathode resistance, R1 and R2, is a linear function of the cathode current, and the plate potential is equal to the plate battery voltage less the cathode resistance drop. The plate potential is therefore an inverse linear function of the cathode current since the plate battery voltage is constant during any series of measuring operations. Furthermore, in a high mu tube, the grid voltage over the range of operation is low relative to other element voltages, so the grid-plate voltage follows the plate-cathode voltage quite closely. Thus the potential applied to the resistance to be measured is approximately inversely proportional to the current through the indicating instrument; zero at zero resistance, half the plate battery voltage at center scale resistance, and the full battery voltage at infinite resistance. In this respect, the general operating characteristics of the logarithmic ohmmeter circuit are similar to those of a conventional ohmmeter circuit. It is to be noted that as the plate current falls off because of lowered plate voltage, the grid current becomes appreciable and maintains the logarithmic characteristic well up to the maximum cathode current.

It is to be understood that the invention is not limited to the particular embodiment herein described or to the use of any particular type of tube as the tubes and measuring ranges may be selected as desired by those familiar with electron tube circuits without departure from the spirit of the invention as set forth in the following claim.

I claim:

In a megohmmeter, a vacuum tube having a grid and plate cooperating with a cathode, a source of plate voltage having a positive terminal connected to said plate, an adjustable resistor and the current responsive element of a sensitive direct current measuring instrument series connected between the negative terminal of said plate voltage and said cathode, said instrument having a single logarithmic scale divided into a plurality of decade ranges of resistance, a second source of voltage connectable across said cathode for heating the same, a compensating resistor connected in circuit with said second voltage source and the current responsive element of said instrument to establish a reverse current flow therethrough, a grid resistor connected between said grid and the negative terminal of said plate voltage source, and input terminals to said plate and grid across which the unknown resistance is connected for measurement of its ohmic value.

ROSWELL W. GILBERT.

REFERENCES CITED

The following references are of record in the file of this patent:

UNITED STATES PATENTS

| Number | Name | Date |
| --- | --- | --- |
| 1,966,185 | Preisman | July 10, 1934 |
| 1,969,518 | Moles | Aug. 7, 1934 |
| 2,033,465 | Graham | Mar. 10, 1936 |
| 2,086,965 | Shepard, Jr. | July 13, 1937 |
| 2,276,152 | Bull et al. | Mar. 10, 1942 |

FOREIGN PATENTS

| Number | Country | Date |
| --- | --- | --- |
| 422,013 | Great Britain | Jan. 3, 1935 |
| 436,923 | Great Britain | Oct. 21, 1935 |
| 452,175 | Germany | Nov. 7, 1927 |